Sept. 10, 1963    L. BRADT ET AL    3,103,183
TOW TRUCK SYSTEMS WITH AUTOMATIC SWITCHING MEANS
Filed Sept. 8, 1961    2 Sheets-Sheet 1
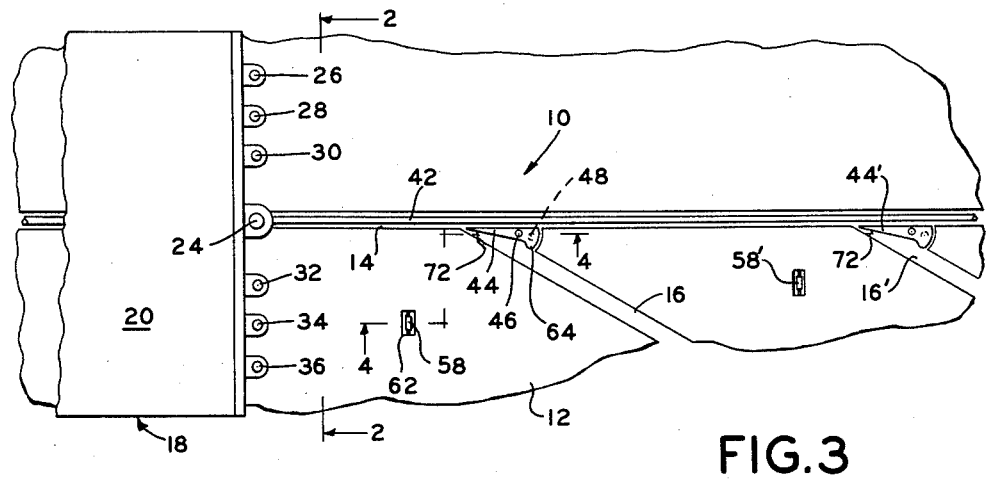
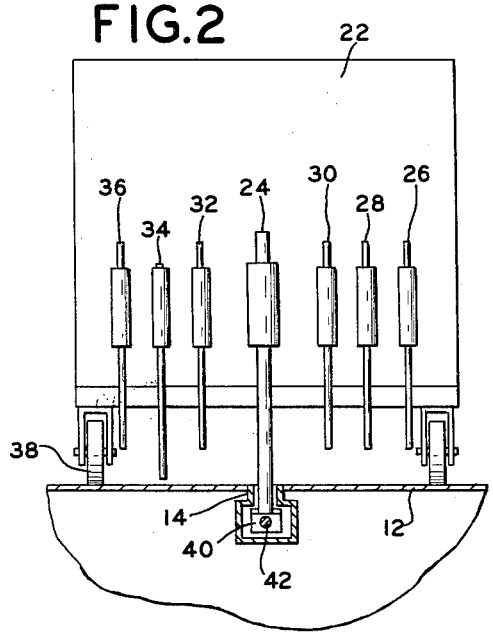
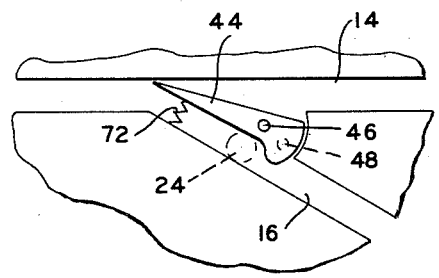
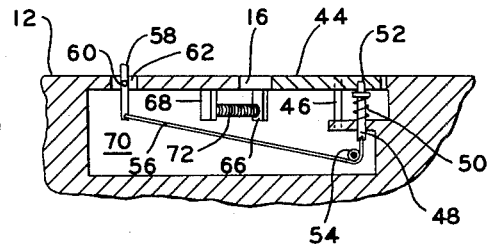
INVENTORS
LYNN BRADT
JOHN G. DORRANCE
BY
ATTORNEY INVENTORS
LYNN BRADT
JOHN G. DORRANCE
BY
Arthur H. Seidel
ATTORNEY

# United States Patent Office 3,103,183
Patented Sept. 10, 1963

3,103,183
TOW TRUCK SYSTEMS WITH AUTOMATIC
SWITCHING MEANS
Lynn Bradt, Easton, Pa., and John G. Dorrance, Phillipsburg, N.J., assignors to SI Handling Systems, Inc., Phillipsburg, N.J., a corporation of Pennsylvania
Filed Sept. 8, 1961, Ser. No. 136,918
17 Claims. (Cl. 104—88)

This invention relates to a tow truck system with automatic switching means, and more particularly to a tow truck system having a truck propelled by the engagement between a tow pin on the truck and a dog on a conveyor cable, with an automatic switching device being provided to transfer the tow pin from a main slot to a shunt slot at preselected station.

A tow truck system having an automatic switching means has been proposed heretofore. For example, see FIGURES 17–19 in U.S. Patent No. 2,936,718. The automatic switching means in said patent has proved to be reliable and adequately performs its intended function. However, said switching means in said patent suffers from a disadvantage in that the switchplate is activated every time a truck passes thereby. This disadvantage has resulted in excess wear during continuous operation.

The present invention overcomes the disadvantage of the switchplate in said patent by providing a novel mechanism structurally interrelated with the switchplate so that the switchplate only obstructs the main slot when it is desired for the particular truck to enter the predetermined shunt slot. In addition, the present invention provides a switching means which is simpler than the switching means disclosed in said patent. The switching means of the present invention may be utilized either with a tow pin which is shifted laterally with respect to the dragline dog or raised vertically for a short distance so as to be clear of the dragline dog while still remaining within the main or shunt slot.

The present invention may be utilized with a tow truck so as to be responsive to one or a plurality of trip rods on the tow truck. The provision of an arrangement wherein the shunting of the truck is responsive to a plurality of trip rods enables the tow truck to be utilized in a system having a larger number of shunt stations. If the shunting of the truck is responsive to a single trip rod, the number of trip rods corresponds to the number of shunt stations. When the shunting of the truck is responsive to a plurality of trip rods in accordance with the present invention, the number of shunt stations corresponds to the product of the number of trip rods on one side of the tow pin and the number of trip rods on an opposite side of the tow pin.

It is an object of the present invention to provide a novel tow truck system having automatic switching means.

It is another object of the present invention to provide a tow truck system with an automatic switching means wherein a switch plate is activated only when it is desired to shunt a truck away from a main slot.

It is still another object of the present invention to provide a novel tow truck system wherein shunting of trucks from a main slot to a shunt slot is responsive to actuation of a plurality of trip rods on the truck.

It is a still further object of the present invention to provide a novel tow truck system wherein shunting of a truck from a main slot to a shunt slot is responsive to contact between a trip rod on a truck and a deflectable abutment adjacent a switch plate at the intersection of the main slot and a shunt slot.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a partial top plan view of the tow truck system of the present invention incorporating the novel automatic switching means of the present invention.

FIGURE 2 is a transverse sectional view taken along lines 2—2 of FIGURE 1.

FIGURE 3 is a top plan view of the intersection of a shunt slot and the main slot illustrated in FIGURE 1, with the switchplate being disposed so as to enable the truck to be diverted to the shunt slot.

FIGURE 4 is a sectional view taken along lines 4—4 of FIGURE 1.

Referring to the drawing in detail, wherein like numerals indicate like elements, there is shown in FIGURE 1 a tow truck system designated generally as 10.

Figure 5:
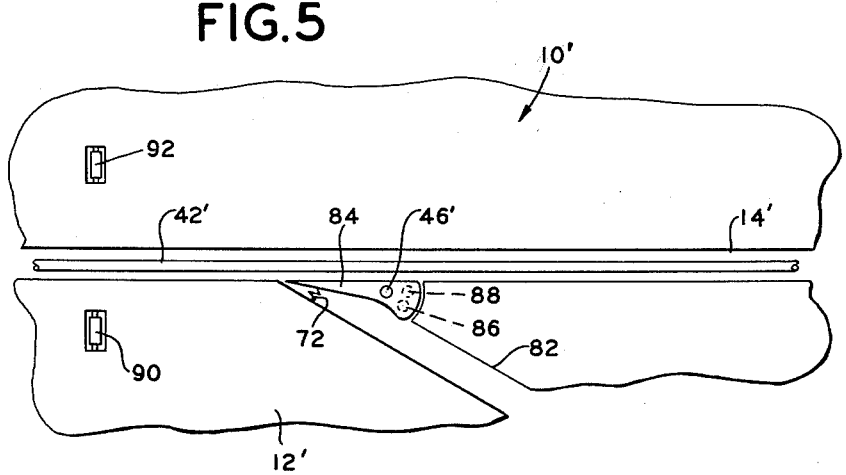
FIGURE 5 is a partial top plan view of the system of the present invention similar to FIGURE 1, but illustrating an alternative embodiment of the automatic switching means of the present invention.

The tow truck system 10 comprises a building having a floor 12, with a main slot 14 being provided in the floor 12. A plurality of shunt slots 16 and 16' intersect the main slot 14 at an acute angle therewith. While only two shunt slots are illustrated in FIGURE 1, it will be obvious that a greater number of shunt slots are normally provided in practice.

Material adapted to be transferred from one location within the building to another location with the tow truck system 10 of the present invention is transported by means of tow trucks 18. A tow truck 18 includes a generally horizontally disposed base 20 having an upright wall or standard 22 at its forward end. A tow pin 24 is supported by the standard 22 in a generally vertical disposition. Any conventional means may be provided for adjusting the vertical disposition of the tow pin 24.

A plurality of trip rods 26–36 are supported by the standard 22 in alignment with and spaced from the tow pin 24. For purposes of illustration, only six such trip rods are illustrated. It will be obvious to those skilled in art that a greater or lesser number of trip rods may be provided. In practice, a larger number of trip rods are usually provided.

The base 20 is provided with wheels 38 which depend therefrom and rollingly support the truck 18 for movement across the floor 12. As seen more clearly in FIGURE 2, the truck 18 is moved across the floor 12 in response to contact between the tow pin 24 and a dog 40 on a drag line cable 42. The lower end of the tow pin 24 extends into the main slot 14 which is defined by a channel-shaped member imbedded in the floor 12 and flush therewith. If desired, the channel-shaped member may be positioned on top of the floor.

The tow pin 24 on a truck 18 is selectively diverted from the main slot 14 to a shunt slot 16 by an automatic switching means. Such automatic switching means includes a rotatably mounted switchplate 44. As seen more clearly in FIGURE 4, the switchplate 44 is generally planar with its uppermost surface being substantially flush with the floor 12. The switchplate 44 is mounted for rotative movement by means of a pin 46.

The switchplate 44 is latched against rotative movement by means of a reciprocally mounted latching member 48 whose upper end is selectively disposed within a blind hole 52 on the lowermost surface of the plate 44.

The upper end of the member 48 is biased toward the hole 52 by a spring 50.

A cable 56 or the like has one end connected to the lowermost end of the member 48 and extends around pulley 54. Any equivalent mechanism may be substituted for the cable 56. The other end of the cable 56 is connected to one end of a latch pin 58. The latch pin 58 extends through a slot 62 in the floor 12 and is rotatably mounted about pin 60 adjacent the surface of the floor 12. It will be noted that the upper end of the latch pin 58 extends above the surface of the floor 12.

As seen more clearly in FIGURE 1, the switchplate 44 is provided with a cam surface 64 and the location of the member 48 is eccentric with respect to the axis of the pin 46 about which the switchplate 44 rotates. The position of the cam surface 64 is in a constricted portion of the shunt slot 16. An arm 66 depends from the lowermost surface of the switchplate 44. An arm 68 depends from the floor 12 into the chamber 70. An expansion spring 72 is disposed intermediate the arms 66 and 68 at a position which is below the lowermost position of the lowermost end surface on the tow pin 24. When the member 48 is disposed out of the hole 52, the spring 72 biases the switchplate 44 to the disposition illustrated in FIGURE 3.

A latch pin 58' is provided for the switchplate 44' adjacent the intersection of the main slot 14 in the shunt slot 16' as shown more clearly in FIGURE 1. It will be noted that the distance between the latch pin 58 and the main slot 14 corresponds with the distance between the trip rod 34 and the tow pin 24. Likewise, the distance between the latch pin 58' and the main slot 14 corresponds with the distance between the trip rod 32 and the tow pin 24.

The operation of the tow truck system 10 is as follows:

The truck 18 will be loaded at a point distant from the shunt slot 16. It is to be assumed that the operator intends the truck 18 to be diverted into the area of the shunt slot 16 for purposes of unloading the material on the truck 18. In order to accomplish this result, the operator has adjusted the trip rod 34 so that it is in its lowermost position while the remainder of the trip rods are in their uppermost position.

The truck 18 is then manually disposed so that the tow pin 24 extends into the main slot 14. A plurality of dogs 40 are provided at spaced points along the length of the continuously moving drag line 42. The next dog which contacts the lowermost end of the tow pin 24 causes the truck 18 to be propelled along the main slot 14 with the wheels 38 rolling on the juxtaposed surface of the floor 12.

The various switchplates at the junction of the main slot and the various shunt slots will remain in a disposition obstructing passage of the tow pin into the shunt slots as illustrated in FIGURE 1.

As the truck 18 approaches shunt slot 16, which is the preselected shunt slot due to the lowermost position of trip rod 34, trip rod 34 deflects the latch pin 58. Deflection of the latch pin 58 causes the cable 56 to withdraw the uppermost end of the member 48 from the hole 52 thereby compressing the spring 50. Thereafter, the spring 72 expands thereby causing the switchplate 44 to obstruct the main slot 14.

The tapered nature of the generally triangular-shaped switchplate 44, when obstructing the main slot 14, causes the tow pin 24 to enter the shunt slot 16 as illustrated in phantom in FIGURE 3. As the tow pin 24 passes the construction formed by the disposition of the cam surface 64, the tow pin 24 abuts the cam surface 64 thereby rotating the switchplate 44 to the disposition illustrated in FIGURE 1.

While the switchplate 44 was in the disposition illustrated in FIGURE 3, the uppermost end of the member 48 was in abutting contact with the lowermost surface of the switchplate 44 due to the bias of the spring 50. When the switchplate 44 resumes the position illustrated in FIGURE 1, the member 48 reenters the hole 52 thereby latching the switchplate in a disposition illustrated in FIGURE 1. In the meantime, it will be noted that the latch pin 58 has resumed the position illustrated in FIGURE 4 under the influence of the expansion of the spring 50 when the uppermost end of the member 48 reentered the hole 52.

If the shunt slot 16 is neither sloped nor provided with a tow device, the truck 18 travels along the shunt slot 16 under the influence of the inertia built up during its travel along the main slot 14. Occasionally, the rear end of the truck 18 may be disposed adjacent the switchplate 44. In this event, the next truck traveling along the main slot 18 will provide the necessary force to assure that the truck 18 will travel along the shunt slot 16 into the prescribed area.

Thus, it will be seen that the switchplate 44 is activated only when it is desired to divert a truck from the main slot to a shunt slot. While the latch pin 58 has been illustrated as being connected to the member 48 by means of a cable 56, it will be obvious that other equivalent mechanisms may be substituted therefor. For example, appropriate levers may be provided so that deflection of the latch pin 58 causes reciprocation of the member 48 away from the plate 44. Also, the latch pin 58 may be reciprocably disposed with a cam surface on its upper end, and fixedly connected to the member 48 so that a trip rod causes the latch pin 58 to reciprocate into the chamber 70 thereby withdrawing the member 48 from the hole 52.

There is shown in FIGURE 5 another embodiment of the present invention designated generally as 10'. The tow truck system 10' is identical with the tow truck system 10 except as will be made clear hereinafter. The tow truck system 10' includes a floor 12' having a main slot 14' therein. A shunt slot 82 intersects the main slot 14' and forms an acute angle therewith. A rotatably mounted switchplate 84 has an edge surface forming a continuation of the main slot 14' thereby obstructing the intersection of the shunt slot 82 and the main slot 14'.

The switchplate 84 is identical with the switchplate 44 except for the addition of a second latching member. Thus, the switchplate 84 is provided with latching members 86 and 88, each of which are identical to the member 48. The member 86 is structurally interrelated with a latch pin 90 which is identical with the latch pin 58. The member 88 is structurally interrelated with the latch pin 92.

The latch pins or abutments 90 and 92 are on opposite sides of the main slot 14' as illustrated, but may be on the same side of slot 14'. Each of the latch pins 90 and 92 are structurally interrelated with their latching members as illustrated in FIGURE 4. Thus, it will be seen that the tow truck system 10' is provided with a switchplate 84 which obstructs passage of the tow pin on a truck into the shunt slot 82 until each of the latch pins 90 and 92 are actuated simultaneously. If only one of the latch pins 90 and 92 is actuated, the switchplate 84 remains in the position illustrated in FIGURE 5.

In the tow truck system 10', the provision of a switchplate which is responsive to two latch pins which must be actuated simultaneously provides a system wherein a larger number of shunt stations may be incorporated. If the truck 18 in the two truck system 10 were provided with ten trip rods on each side of the tow pin 24, the truck 18 could be utilized with a system having twenty shunt stations. If this same imaginary truck having ten pins on each side of the tow pin 24 were utilized in the tow truck system 10', the truck may be utilized in a system having one hundred shunt stations. Thus, the provision of a system responsive to two trip rods on a truck enables the truck to be utilized in a system which has a number of shunt stations corresponding to the product of the number of trip rods on one side of the tow pin and the number of trip rods on the other side of the tow pin. It will be clear that the truck 18 illustrated in FIGURES 1 and 2 can be utilized with the tow truck system 10'.

The truck 18 is provided with a tow pin which is capable of being shifted laterally of the dog 40 when being diverted into the shunt slot 16. Certain types of dogs are not readily adaptable to a transverse shifting of the tow pin and require the tow pin to be raised vertically in order to be clear of the dog. The truck 18, which may be utilized with the tow truck system 10 or 10', is illustrative of a truck wherein means are provided so that the tow pin is raised vertically when it is desired to be clear of the dog. The amount of vertical movement of the tow pin is insufficient to completely raise the tow pin out of the main slot.

Figure 6:
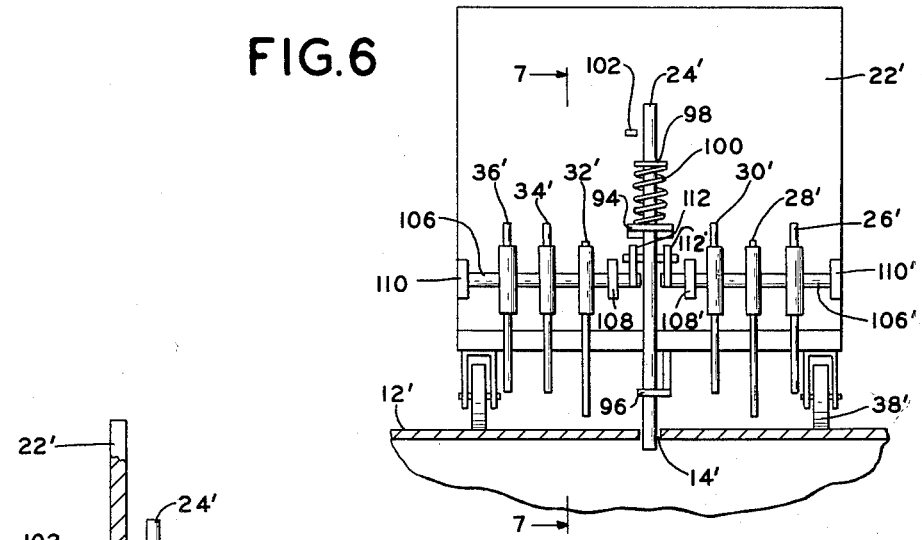
FIGURE 6 is a front view of an alternative embodiment of a tow truck adapted for use with the tow truck system of the present invention.

The truck 18' is identical with the truck 18 except as will be made clear hereinafter. Corresponding elements on the trucks 18 and 18' are provided with corresponding primed numerals. As shown more clearly in FIGURES 6 and 7, the tow pin 24' is supported for vertical adjustment by means of a pair of spaced guide brackets 94 and 96. A collar 98 is fixedly secured to the tow pin 94 at a spaced distance along its longitudinal axis above the guide bracket 94.

A coil spring 100 surrounds the tow pin 24' and is disposed between the guide bracket 94 and the collar 98. The spring 100 tends to bias the tow pin 24' in a vertical direction away from the floor 12'. The amount by which the tow pin 24' may be raised by means of the bias imparted by the spring 100 is limited by contact between the collar 98 and a vertically adjustable limit stop 102 mounted on the standard 22'.

A pin 104 extends from opposite sides of the tow pin 24'. Means are provided for cooperation with the pin 104 to retain the tow pin 24' in its lowermost position so that abutting contact is made with the dog on the drag line. Such means include a pair of crossbars 106 and 106'. The ends of the crossbars 106 and 106' are rotatably supported by bearings 108, 108', 110 and 110' which are fixedly secured to the standard 22'. A jaw 112 is provided at the end of the crossbar 106 adjacent the tow pin 24'. A jaw 112' is provided at the end of the crossbar 106' adjacent the tow pin 24'.

Figure 7:
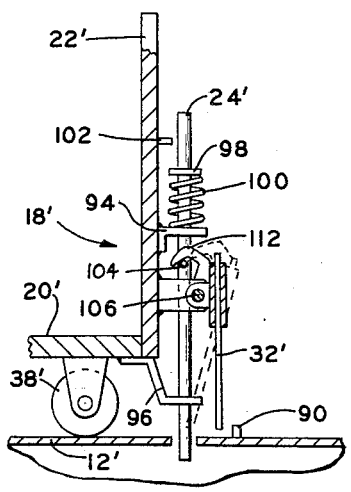
FIGURE 7 is a sectional view taken along lines 7—7 of FIGURE 6.

As seen more clearly in FIGURE 7, the jaw 112 cooperates with the pin 104 to retain the tow pin 24' in its lowermost position. A plurality of cylindrical casings are fixedly secured to the crossbars 106 and 106'. Trip rods 26'–36' are adjustably supported within one of the casings fixedly secured to the crossbars 106 and 106'. Any one of a wide variety of means may be provided to facilitate vertical adjustment of the trip rods with respect to their casings such as a bayonet slot, screw threads, a pin and notch arrangement, a detent arrangement, etc. Each of the trip rods 26'–36' have an uppermost position wherein the trip rods will clear the latch pins on the floor 12' and a lowermost position wherein the trip rods will deflect the latch pins and cause the crossbar adjacent thereto to rotate in a clockwise direction in FIGURE 7. Rotation of the crossbars in a clockwise direction in FIGURE 7 releases the engagement between the jaws 112, 112' and pin 104 so that the tow pin 24' may be raised vertically under the influence of the spring 100.

The operation of the tow truck system 10' is as follows:

The operation of the tow truck system 10' is identical with the operation of the tow truck system 10 except as will be made clear hereinafter. When the truck 18 is utilized with the tow truck system 10', it will be assumed for purposes of illustration that the trip rods 32 and 28 are in their lowermost position while the remainder of the trip rods are in their uppermost position. As the truck 18 approaches the intersection of the main slot 14' and the shunt slot 82, each of the latch pins 90 and 92 will be deflected thereby withdrawing the members 88 and 86 from their respective holes. Thereafter, the switchplate 84 will be rotated in a clockwise direction in FIGURE 5 under the influence of a spring corresponding to the spring 72 thereby obstructing the main slot 14'. Thus, the tow pin 24 will engage a surface of the switchplate 84 and be shifted laterally of the dog on the drag line and pass into the shunt slot 82. The return of the switchplate 84 to the position illustrated in FIGURE 5 is explained above.

If only the trip rod 28 is in its lowermost position, only the latch pin 92 will be deflected. Accordingly, the switchplate 84 will remain in the position illustrated in FIGURE 5 and the truck 18 will continue on past the shunt slot 82 under the influence of the dog on the drag line. If only the trip rod 32 is in its lowermost position, only the latch pin 90 will be deflected and the switchplate 84 will remain in the position illustrated in FIGURE 5. Accordingly, the truck 18 will continue moving along the main slot 14' past the shunt slot 82 under the influence of the dog on the drag line. Thus, it will be clear that each of the latch pins 90 and 92 must be simultaneously deflected in order to switch the truck 18 from the main slot 14 to the shunt slot 82.

When the truck 18' is utilized with the system 10', the shunting of trucks is identical with the explanation given above in conjunction with the use of trucks 18 in the system 10'. However, when each of the trip rods 32' and 28' deflects the latch pins 90 and 92 respectively, the deflection of the latch pins also causes the trip rods to rotate in a clockwise direction as illustrated in FIGURE 7 so that the jaws 112 and 112' rotate out of blocking engagement with the pin 104. Thereafter, the tow pin 24' is raised in a vertical direction so as to enable the lowermost end of the tow pin 24' to clear the dog on the drag line. Each of the trip rods 28' and 32' in the illustration of the present invention must be deflected by engagement with a latch pin so that the tow pin may move vertically and each of the latch pins must be deflected so that the switchplate 84 may rotate to a disposition wherein it obstructs the main slot 14'. Thus, it will be seen that the truck 18', as illustrated, cannot be utilized in the system 10.

However, the truck 18' is readily adaptable for use in the system 10 by elimination of the crossbar 106' and mounting each of the trip rods on the crossbar 106 which may extend across the full width of the truck 18'.

The present invention may be embodied in other specific forms without departing from the spirit or essential attributes thereof and, accordingly, reference should be made to the appended claims, rather than to the foregoing specification as indicating the scope of the invention.

We claim:

1. A tow truck system comprising a first means defining a first slot, a second means defining a second slot intersecting said first slot at an acute angle, movable switchplate means supported adjacent the intersection of said slots, said switchplate means being mounted for movement between first and second positions, said switchplate means forming a portion of said first means and obstructing said second slot in its first position, said switchplate means forming a portion of said second means and obstructing said first slot in its second position, means biasing said switchplate means toward its second position, releasable latch means adjacent the intersection of said slots for holding said switchplate means in its first position, and mechanical means for automatically moving said switchplate means from its second position to its first position in response to shunting a member from movement along said first slot to movement along said second slot.

2. A system in accordance with claim 1 wherein said latching means comprises an upright latching member mounted for movement into and out of a hole in said switchplate means, and a linkage interconnecting said latching member with a latch pin, said latch pin being mounted at a point remote from the included angle formed by the intersection of said slots.

3. A system in accordance with claim 1 wherein said first and second means include a substantially horizontal floor in which said slots are disposed, and said switchplate means being a substantially planar plate rotatably mounted in said floor with the uppermost surface of said plate being substantially flush with said floor.

4. A system in accordance with claim 3 wherein said releasable latching means includes a movable element structurally interrelated with a latch pin, said latch pin being movably supported in said floor at a point remote from the included angle formed by the intersection of said slots, said latch pin extending to a point above said floor, whereby a predetermined amount of movement of said latch pin causes said latching means to be released so that said biasing means moves said switchplate to said first position thereof.

5. A system in accordance with claim 4 wherein said movable element and said latch pin are interconnected by a flexible cable.

6. A tow truck system comprising a first means defining a first slot, a second means defining a second slot intersecting said first slot at an acute angle, movable switchplate means supported adjacent the intersection of said slots, said switchplate means being mounted for movement between first and second positions, said switchplate means forming a portion of said first means and obstructing said second slot in its first position, said switchplate means forming a portion of said second means and obstructing said first slot in its second position, means biasing said switchplate means toward its second position, releasable latching means holding said switchplate means in its first position, said first and second means including a substantially horizontal floor in which said slots are disposed, said switchplate means being a substantially planar plate rotatably mounted in said floor with the uppermost surface of said plate being substantially flush with said floor, said releasable latching means including a movable element structurally interrelated with a latch pin, said latch pin being movably supported in said floor at a point remote from the included angle formed by the intersection of said slots, said latch pin extending to a point above said floor whereby a predetermined amount of movement of said latch pin causes said latching means to be released so that said biasing means moves said switchplate to said first position thereof, and a second movable element is structurally interrelated with said switchplate in the same manner as said first mentioned movable element, a second latch pin structurally interrelated with said second movable element in the same manner as the structural interrelationship between said first mentioned latch pin and said first mentioned movable element, whereby each of said latch pins must be deflected in order for said biasing means to move said switchplate from the second position of said switchplate to the first position of said switchplate.

7. A tow truck system comprising a floor, a first means defining a first slot in said floor, a second means defining a second slot intersecting said first slot at an acute angle, a third means defining a third slot intersecting said first slot at an acute angle and spaced longitudinally along said first slot from said second slot, movable switchplate means supported adjacent the intersections of said slots, each switchplate means being mounted for movement between first and second positions, each switchplate means forming a portion of said first means in its first position, each switchplate means obstructing said first slot in its second position, means biasing each switchplate means toward its second position, releasable latch means holding each switchplate means in its first position, the releasable latch means on the switchplate means disposed adjacent the intersection of said first and second slots being responsive to an element spaced from the included angle formed by the intersection of said first and second slots, the releasable latch means associated with the switchplate means adjacent the intersection of said first and third slots being responsive to an element spaced from the included angle formed by the intersection of said first and third slots and mechanical means for automatically moving said switchplate means from its second position to its first position in response to shunting a member from movement along said first slot to movement along said second slot.

8. A tow truck system comprising a floor, a first means defining a first slot in said floor, a second means defining a second slot intersecting said first slot at an acute angle, a third means defining a third slot intersecting said first slot at an acute angle and spaced longitudinally along said first slot from said second slot, movable switchplate means supported adjacent the intersections of said slots, each switchplate means being mounted for movement between fisrt and second positions, each switchplate means forming a portion of said first means in its first position, each switchplate means obstructing said first slot in its second position, releasable latch means holding each switchplate means in tis first position, the releasable latch means on the switchplate being disposed adjacent the intersection of said first and second slots being responsive to an element spaced from the included angle formed by the intersection of said first and second slots, the releasable latch means associated with the switchplate means adjacent the intersection of said first and third slots being responsive to an element spaced from the included angle formed by the intersection of said first and third slots, and the releasable latch means for each switchplate means includes a pair of latch members, each member being responsive to a separate element, each switchplate means being biased to its second position by said biasing means only when the pair of elements for each switchplate means are actuated simultaneously.

9. A system in accordance with claim 8 wherein the pair of elements associated with each switchplate means are disposed on opposite sides of said first slot.

10. A tow truck system comprising a floor having a first means defining a first slot in said floor, a second means defining a second slot in said floor, said second slot intersecting said first slot at an acute angle, a movable switchplate means supported adjacent the intersection of said slots, said switchplate means having a first position wherein it obstructs said second slot and a second position wherein it obstructs said first slot, a tow truck, a tow pin on said truck having a portion disposed within said first slot, a member on said truck for initiating movement of said switchplate means from said first position to said second position so that said tow pin is diverted into said second slot, and means responsive to the entry of said tow pin into said second slot for moving said switchplate means from said second position to said first position.

11. A system in accordance with claim 10 wherein said last mentioned means is a cam surface on said switchplate means.

12. A system in accordance with claim 10 wherein said member is structurally interrelated with a crossbar on said truck, said crossbar being rotatably mounted on said truck, said crossbar having a means structurally interrelated with said tow pin so as to retain said tow pin in a lowermost position against the bias of a spring means, said spring means being interrelated with said tow pin so as to bias said tow pin in a direction away from said first slot.

13. A system in accordance with claim 12 wherein said truck is provided with a second crossbar structurally interrelated with said tow pin in the same manner as said first-mentioned crossbar.

14. A tow truck system comprising a floor having a first means defining a first slot therein, a second means defining a second slot in said floor intersecting said first slot at an acute angle, a movable switchplate means supported by said floor adjacent the intersection of said slots, a tow truck having a tow pin disposed within said main slot, two trip rods supported by said truck, means structurally interrelating said trip rods with said tow pin so that said tow pin may be raised vertically through a predetermined distance in response to simultaneous actuation of said trip rods, first and second abutment elements on said floor on opposite sides of said first slot, said abutments being structurally interrelated with said switchplate means, said switchplate means having a first position wherein it forms a portion of said first means, said switchplate means having a second position wherein it obstructs said first slot, means biasing said switchplate means toward said second position, a pair of releasable latching members holding said switchplate means in said first position, and said structural interrelationship between said abutment elements and said switchplate means being an interconnection between said latching members and said elements whereby simultaneous actuation of said abutment elements enables said biasing means to move said switchplate from said first position to said second position.

15. The system in accordance with claim 14 including means responsive to movement of said tow pin into said second slot for moving said switchplate means from said second position to said first position wherein said switchplate means will be held by said releasable latch means.

16. A tow truck system comprising a first means defining a first slot, a second means defining a second slot intersecting said first slot, a movable switch plate supported adjacent the intersection of said slots, a latching means retaining the switch plate in a disposition obstructing said second slot, said latching means being mounted adjacent the intersection of said first and second slots, means biasing said switch plate to a disposition wherein it obstructs the first slot, said latching means being responsive to simultaneous actuation of two latch pins and a cam means on said switchplate for automatically moving said switchplate from its disposition obstructing said first slot to its disposition obstructing said second slot in response to shunting of a member from movement along said first slot to movement along said second slot.

17. A tow truck system comprising a first means defining a first slot, a second means defining a second slot intersecting said first slot at an acute angle, movable switchplate means supported adjacent the intersection of said slots, said switchplate means being mounted for movement between first and second positions, said switchplate means forming a portion of said first means and obstructing said second slot in its first position, said switchplate means forming a portion of said second means and obstructing said first slot in its second position, means biasing said switchplate means towards its second position, releasable latch means holding said switchplate means in its first position, said releasable latch means being mounted adjacent the intersection of said first and second slots, said switchplate means being provided with a cam surface which cooperates with said second means to define a constriction in said second slot.

References Cited in the file of this patent
UNITED STATES PATENTS

| 1,072,409 | Wright et al. | Sept. 2, 1913 |
| 1,124,268 | Bernheim | Jan. 12, 1915 |
| 1,602,379 | Lawrence | Oct. 5, 1926 |
| 1,878,605 | Schmidt et al. | Sept. 20, 1932 |
| 2,936,718 | Bradt et al. | May 17, 1960 |
| 2,965,043 | Klamp et al. | Dec. 20, 1960 |